(12) United States Patent
Li

(10) Patent No.: US 6,889,926 B1
(45) Date of Patent: May 10, 2005

(54) SPINCAST FISHING REEL HAVING IMPROVED FRONT COVER AND METHOD OF MAKING SAME

(75) Inventor: Chi Shing Li, Hong Kong (CN)

(73) Assignee: Shakespeare Company, Columbia, SC (US)

( * ) Notice: Subject to any disclaimer, the term of this patent is extended or adjusted under 35 U.S.C. 154(b) by 0 days.

(21) Appl. No.: 10/158,564

(22) Filed: May 30, 2002

(51) Int. Cl.⁷ .............................................. A01K 89/01
(52) U.S. Cl. ...................... 242/311; 242/310; 242/315; 242/238
(58) Field of Search ........................ 242/310, 311, 312, 242/314, 315, 238

(56) References Cited

U.S. PATENT DOCUMENTS

| | | | |
|---|---|---|---|
| 2,630,979 A | | 3/1953 | Uerling |
| 3,059,873 A | * | 10/1962 | Hull ............................ 242/238 |
| 4,331,303 A | | 5/1982 | Moss |
| 4,448,367 A | | 5/1984 | Puryear |
| 4,961,547 A | | 10/1990 | Peterson et al. |
| 5,149,010 A | | 9/1992 | Bacher |
| 5,316,238 A | * | 5/1994 | Simonson .................... 242/234 |
| 5,318,242 A | | 6/1994 | Kirby et al. |
| 5,370,328 A | | 12/1994 | Kirby |
| 5,377,924 A | * | 1/1995 | Takeuchi ..................... 242/238 |
| 6,138,935 A | | 10/2000 | Zwayer et al. |

* cited by examiner

*Primary Examiner*—Eileen D. Lillis
*Assistant Examiner*—E. Langdon
(74) *Attorney, Agent, or Firm*—Nelson Mullins Riley & Scarborough, LLP

(57) ABSTRACT

A fishing reel cover is connectable to a fishing reel to define a compartment in which reel components are located. The cover comprises an inner cone element nested and securely fixed within an outer sheath element. A rearward end of the inner cone element includes a first interlocking connection feature such as internal threads adapted to engage a second interlocking connection feature such as external threads located on the fishing reel. The forward ends of the inner cone and outer sheath elements preferably define aligned guide holes through which an eyelet may be inserted. Preferably, the inner cone element will be formed of plastic with the outer sheath element being formed of metal.

10 Claims, 4 Drawing Sheets

SPINCAST FISHING REEL HAVING IMPROVED FRONT COVER AND METHOD OF MAKING SAME

BACKGROUND OF THE INVENTION

The present invention relates generally to an improved front cover for a fishing reel such as a spincast reel. More particularly, the invention relates to improvements in the structure and method of assembly of a fishing reel front cover.

A variety of different types of fishing reels are available in the marketplace. One common type of reel, known as a spincast reel, typically has a reel body to which a front cover (or "front cone") is attached. The front cover defines a front compartment in which a line spool and pickup head are located. The pickup head rotates when the reel's crank handle is turned by a user so as to wind fishing line around the spool. The fishing line extends through an opening at the forward end of the front cover.

A metal front cover is desirable as it provides an attractive finish and a solid feel when handled. However, the front cover must have a suitable locking mechanism to attach it to the main body. For example, the front cover may be equipped with internal threads that engage external threads defined on a forward portion of the main body. Alternatively, the cover may include tabs that are twisted into corresponding slots located in the reel frame. It is often not cost effective to form these features from metal.

Thus, the art has provided various two-piece front cones in which a metal cone is attached to a plastic locking piece. One example of this technique is described in U.S. Pat. No. 5,149,010 to Bacher. The Bacher patent shows a front cover having a first cylindrical part (11a) having a front and rear edge. The second part (11b) has a conical forward portion and a cylindrical rearward portion. The second part defines tabs (54) that seat within cutouts (60) defined in the first part to lock the parts together. The first part may be made of plastic and the second part may be made of metal, such as aluminum.

While this two-piece technique has worked generally well, it is not without disadvantages. Because internal components push on the front cone with considerable force, the two-piece cover may not be reliable in the long run and may exhibit rigidity problems.

SUMMARY OF THE INVENTION

In one aspect, the present invention provides a fishing reel cover connectable to a fishing reel to define a compartment in which reel components are located. The cover comprises an inner cone element nested and securely fixed within an outer sheath element. A rearward end of the inner cone element includes a first interlocking connection feature adapted to engage a second interlocking connection feature located on the fishing reel. A forward end of the inner cone element defines a first line guide hole. A forward end of the outer sheath element defines a second line guide hole in register with the first line guide hole.

In some exemplary embodiments, a circumferential groove is defined about the outer surface of the inner cone element adjacent to the rearward end thereof. In such embodiments, the rearward end of the outer sheath element includes a lip received in the circumferential groove. Preferably, the inner cone element may include a retention bulge adjacent to the circumferential groove so as to facilitate retention of the lip therein. For example, the retention bulge may be formed as a ramp portion of increasing outer diameter in order to facilitate seating of the lip in the circumferential groove.

Often, the inner cone element may define an annular band of increased outer diameter located between the rearward end of the inner cone element and the circumferential groove. In some such embodiments, the first interlocking connection feature may comprise threads defined on an inner surface of the annular band.

Embodiments of the invention are contemplated in which an eyelet extends through the first line guide hole and the second line guide hole. Preferably, the eyelet may be crimped in position so as to facilitate securement of the outer sheath element to the inner cone element.

In some exemplary embodiments, the inner cone element may define a reduced inner diameter portion against which fishing line is pinched for casting.

In another aspect, the present invention provides a method of assembling a front reel cover for a fishing reel. One step of the method involves providing an inner cone element formed substantially entirely of plastic. The inner cone element has a forward end defining a first line guide aperture and a rearward end including a first interlocking connection feature adapted to engage a second interlocking connection feature located on the fishing reel. An additional step of the method involves providing an outer sheath element made of metal. The outer sheath element is configured to be received over and intimately nested with the inner cone element. Moreover, the outer sheath element has a second line guide hole at a forward end thereof.

According to a further step of the method, the inner cone element and the outer sheath element are axially moved into nesting engagement with one another such that the first line guide hole and the second line guide are in axial alignment. Finally, the inner cone element and the outer sheath element are secured together to form the front cover.

A further aspect of the present invention is provided by a fishing reel cover connectable to a fishing reel to define a compartment in which reel components are located. The cover comprises an inner cone element located within an outer sheath element. A rearward end of the inner cone element includes a first interlocking connection feature adapted to engage a second interlocking connection feature located on the fishing reel. The inner cone element defines a circumferential groove extending about an outer surface thereof adjacent to its rearward end. In addition, the outer sheath element includes a lip which is received in the circumferential groove.

Other objects, features and aspects of the present invention are discussed in greater detail below. The accompanying drawings are incorporated in and constitute a part of the specification, and illustrate one or more embodiments of the invention. These drawings, together with the description, serve to explain the principles of the invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
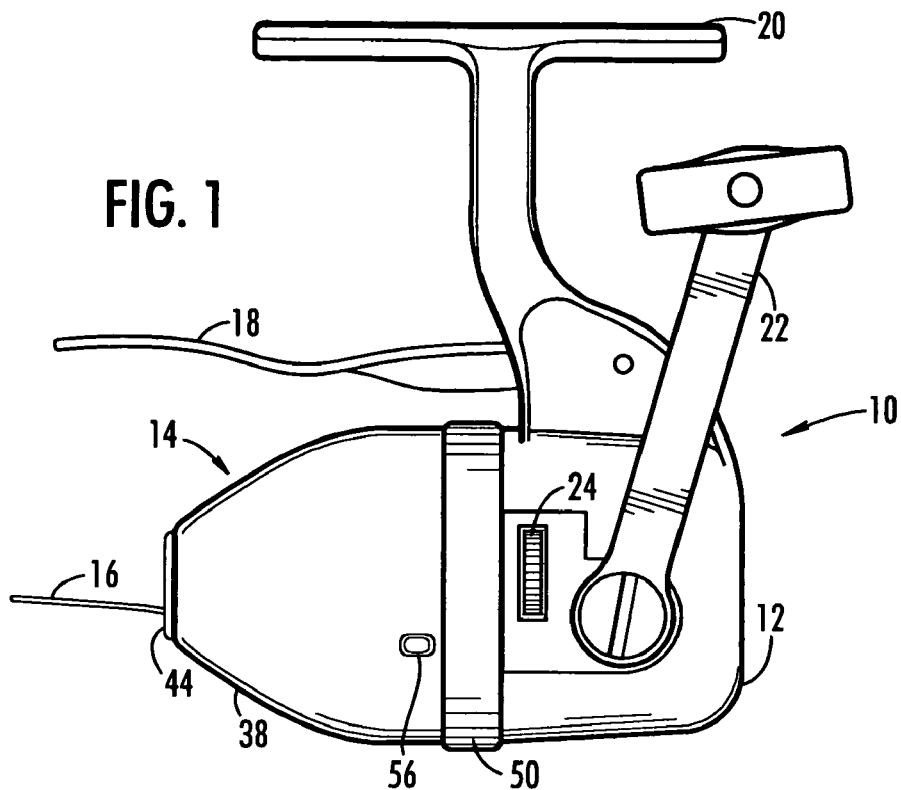
FIG. 1 is an elevational view of a spincast fishing reel including a front cover constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting of the broader aspects of the present invention, which broader aspects are embodied in the exemplary constructions.

FIG. 1 illustrates a spincast reel 10 having a reel frame 12 to which a front cover 14 is detachably connected. Fishing line 16 extends through a forward opening defined in front cover 14. In this embodiment, a casting lever 18 is pivotally connected to reel frame 12. A user actuates casting lever 18 to allow casting of fishing line 16 in a well-known manner. Embodiments are also contemplated that utilize a thumb button or other alternative actuator instead of a casting lever.

Preferably, reel frame 12 includes an attachment foot 20 to permit the reel to be mounted to a fishing rod. A crank handle 22 is provided for winding fishing line 16 back in. A rotatable drag wheel 24 allows the user to adjust a drag force imposed on the line spool.

Figure 2:
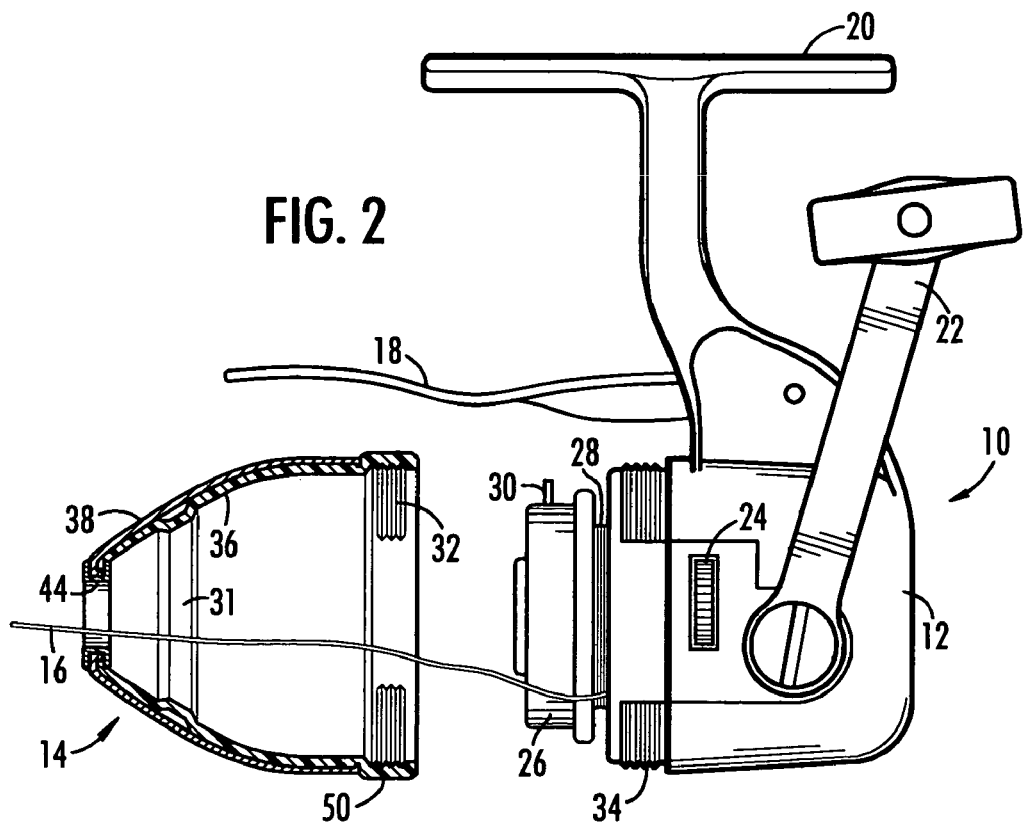
FIG. 2 is a view similar to FIG. 1 with the front cover shown in cross-section and removed from the reel.

Referring now to FIG. 2, front cover 14 is detached to illustrate various components located within the front compartment of reel 10. Such components include a pickup head 26, which is operatively connected to crank handle 22. As crank handle 22 is turned by a user, pickup head 26 engages fishing line 16 so as to wind it onto a normally nonrotatable line spool 28.

In this case, pickup head 26 is constructed having at least one pickup pin 30. As one skilled in the art will appreciate, pickup pin 30 is retracted into pickup head 26 during casting of fishing line 16. A reduced inner diameter portion 31 may be located on the inside of front cone 14 against which fishing line 16 is pinched for casting. When fishing line 16 is being retrieved, however, pickup pin 30 is extended (as shown) to engage the line. Although the illustrated embodiment utilizes a pickup pin, one skilled in the art will appreciate that other pickup head arrangements may also be utilized.

Front cover 14 includes a suitable interlocking connection feature by which it is connected to the remainder of the reel. In this case, for example, front cover 14 defines internal threads 32 which engage external threads 34 located on reel body 12. While threads are illustrated in this exemplary embodiment, one skilled in the art will appreciate that other suitable types of interlocking connection features could also be utilized. For example, alternative embodiments of the present invention utilize tabs that are twisted into corresponding slots located in the reel frame.

Figure 3:
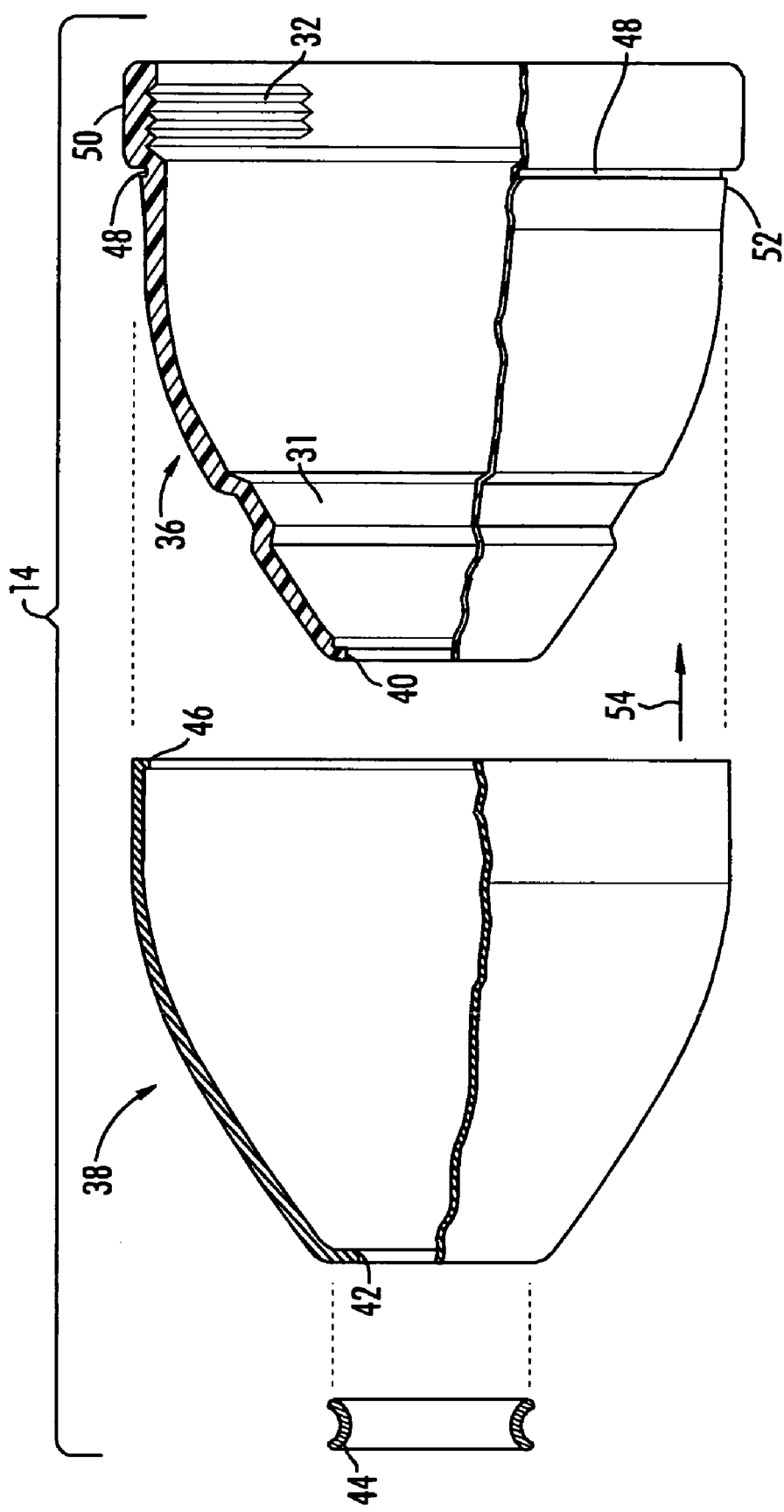
FIG. 3 is an exploded view partially in section of the front cover utilized in the reel of FIG. 1.

As shown in FIGS. 2 and 3, front reel cover 14 includes an inner cone element 36 intimately nested and securely fixed within an outer sheath element 38. Preferably, inner cone element 36 may be formed of nylon or other suitable plastic, with outer sheath element 38 being formed of suitable metal, such as aluminum. Because inner cone element 36 is preferably formed of plastic, most any connection feature may be easily molded. Outer sheath element 38, being preferably formed of metal, provides a tough protective shell against scratch and impact. Outer sheath element 38 also provides rigidity to the overall cover.

In the illustrated embodiment, inner cone element 36 defines a guide hole 40 at an axially forward end thereof. Similarly, outer sheath element 38 defines a guide hole 42. An eyelet 44 may preferably extend through guide holes 40 and 42, as shown. Preferably, eyelet 44 may be maintained in position by crimping or other suitable means so as to facilitate securement of elements 36 and 38 to each other. Eyelet 44 also provides a smooth surface through which fishing line 16 can pass.

As can be seen, outer sheath element 38 defines a radially inward projecting rolled edge or lip 46. In one preferred embodiment, lip 46 forms a continuous radially inward directed projection at the rearward end of outer sheath element 38. As shown, inner cone element 36 defines a circumferential groove 48 on an axially rearward portion thereof. In this case, lip 48 is spaced from the rearward end of inner cone element 36 by an annular band 50. Band 50 advantageously serves as a gripping portion which can be grasped by a user either removing or attaching front cover 14.

On the axially forward side, groove 48 is bounded by a retention bulge which facilitates retention of lip 46 therein. In presently preferred embodiments, the retention bulge is formed as a frustoconical (or "ramp") portion 52 which faciliates seating of lip 46. Lip 46 is dimensioned and configured so that when outer sheath element 38 is mated with inner cone element 36 (by moving together as indicated by arrow 54), lip 46 will pass over ramp portion 52 to snap into place in groove 48. The incorporation of a snap-fit between lip 46 and groove 48 provides effective securement between the nesting elements due to the uniformly distributed annular hoop stress. Once outer sheath element 38 snaps into place on inner cone element 36, eyelet 44 may be crimped in this embodiment around adjacent guide holes 40 and 42 as shown in FIG. 2.

Figure 4:
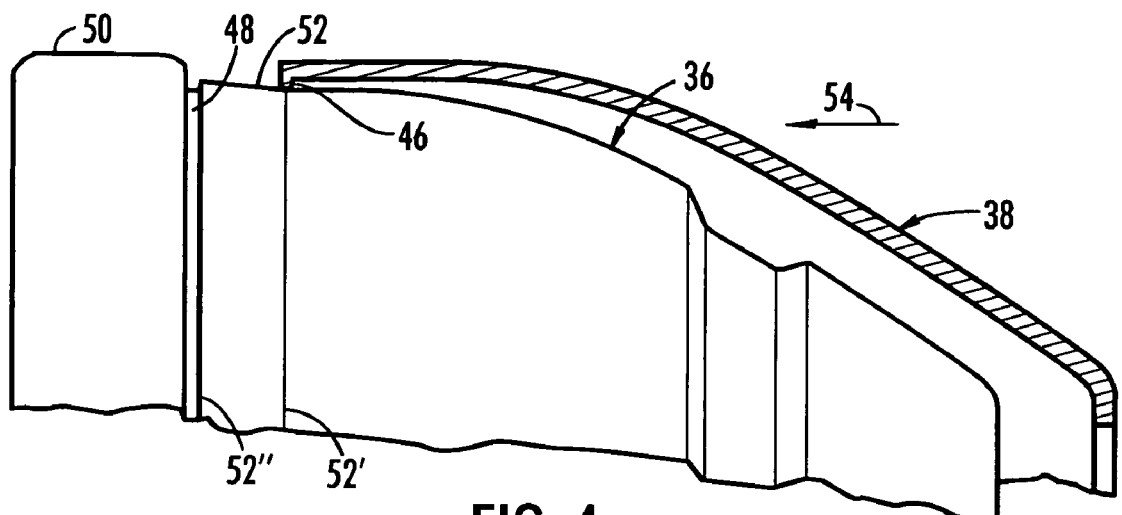
FIG. 4 is a partial view of the front cover of FIG. 3 showing the inner cone and outer sheath prior to final assembly.
Figure 4A:
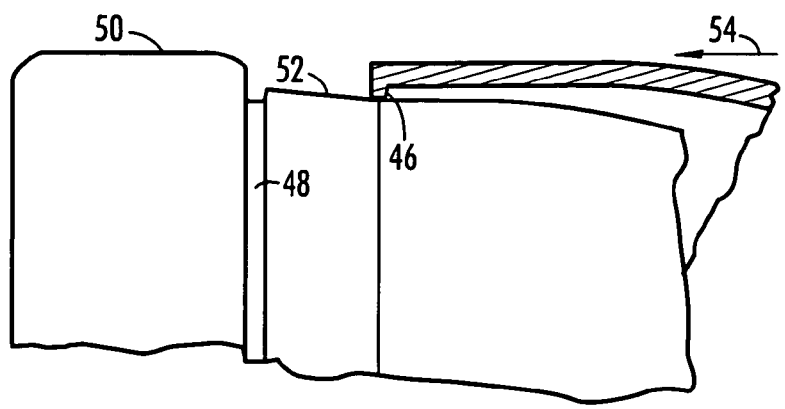
FIG. 4A is a close-up view of a portion of FIG. 4.

Referring now to FIGS. 4 and 4A, lip 46 fits snugly against a forward edge 52' of ramp portion 52 during initial assembly of front cover 14. As outer sheath element 38 moves into nesting engagement with inner cone element 36 (in direction of arrow 54), lip 46 begins to ride up ramp portion 52.

Figure 5:
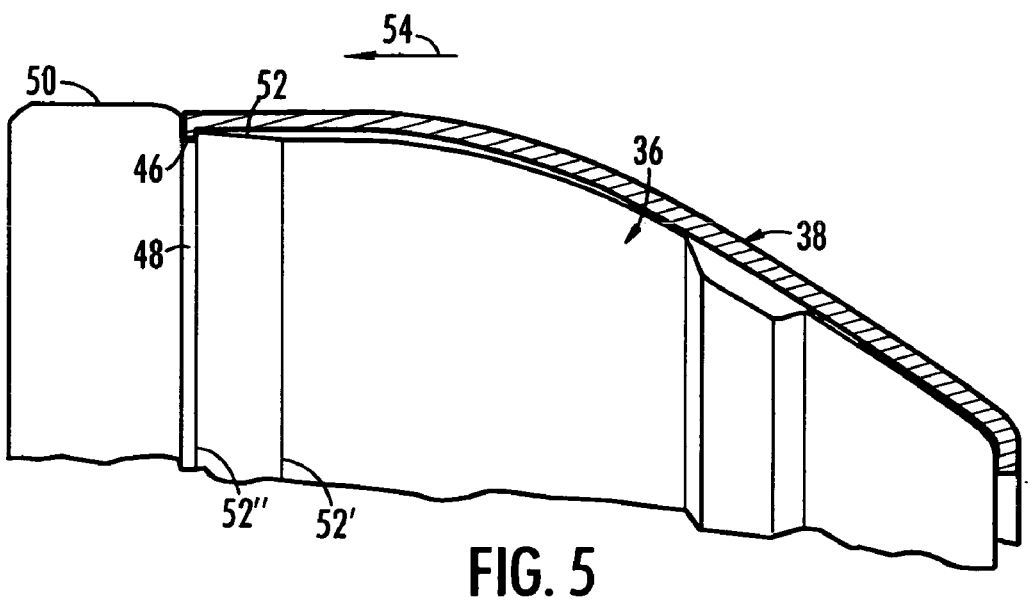
FIG. 5 is a partial view of the front cover of FIG. 3 showing the inner cone and outer sheath assembled together.
Figure 5A:
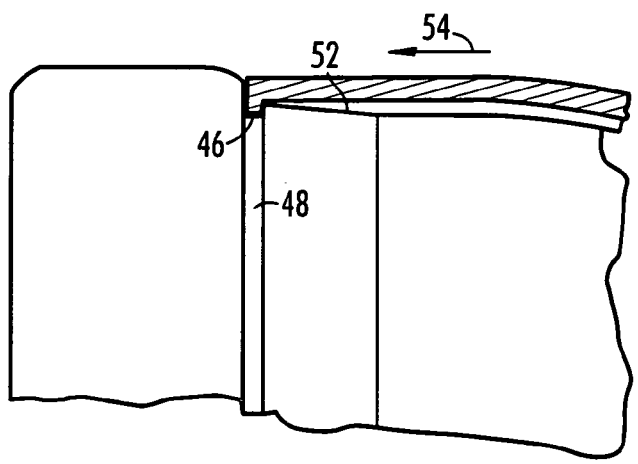
FIG. 5A is an close-up view of a portion of FIG. 5.

As shown in FIGS. 5 and 5A, lip 46 eventually snaps into place when it becomes axially aligned with groove 48. A rearward edge 52" of ramp portion 52 has a diameter greater than the at rest inner diameter of lip 46 in order to hold outer sheath element 38 with respect to inner cone element 36.

Figure 6:
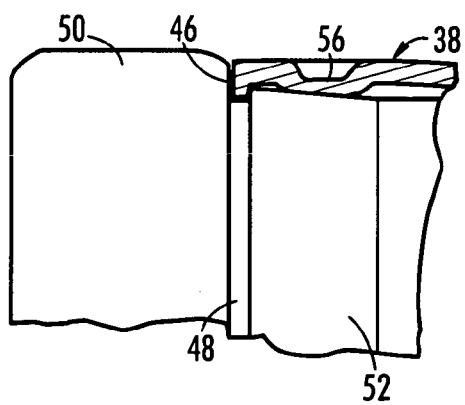
FIG. 6 is an enlarged viewing showing a notch in the outer sheath for inhibiting relative rotation between the outer sheath and the inner cone.
Figure 6A:
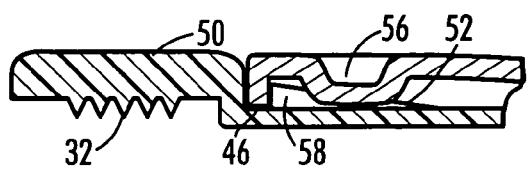
FIG. 6A is a close-up sectional view of a portion of FIG. 6.

Referring again to FIG. 1, at least one notch 56 may be formed in outer sheath element 38. As shown in FIGS. 6 and 6A, notch 56 is preferably received in an angular gap 58 defined in the circumference of ramp portion 52. Notch 56 and gap 58 thus function as a key and keyway to further prevent rotation of outer sheath element 38 with respect to inner cone element 36. In one preferred embodiment of the present invention, two such notches are provided, spaced apart by 180 degrees.

While preferred embodiments of the invention have been shown and described, modifications and variations thereto may be practiced by those of ordinary skill in the art without departing from the spirit and scope of the present invention, which is more particularly set forth in the appended claims. In addition, it should be understood that aspects of the various embodiments may be interchanged both in whole or in part without departing from the scope of the present invention. Furthermore, those of ordinary skill in the art will appreciate that the foregoing description is by way of example only, and is not intended to limit the invention so further described in such appended claims.

What is claimed is:

1. A fishing reel cover connectable to a fishing reel to define a compartment in which reel components are located, said cover comprising:

an inner cone element nested and securely fixed within an outer sheath element;

said inner cone element having a rearward end and a forward end, said rearward end of said inner cone element including a first interlocking connection feature adapted to engage a second interlocking connection feature located on said fishing reel, said forward end of said inner cone element defining a first line guide hole;

said outer sheath element having a rearward end and a forward end, said forward end of said outer sheath element defining a second line guide hole in register with said first line guide hole;

said inner cone element being intimately nested with said outer sheath element such that an outer surface thereof is substantially complementary to the inner surface of said outer sheath element;

said inner cone element defining a circumferential groove extending about an outer surface thereof adjacent to said rearward end thereof, said rearward end of said outer sheath element including a lip received in said circumferential groove; and said inner cone element further including a retention bulge adjacent to said circumferential groove so as to facilitate retention of said lip therein, said retention bulge being formed as a ramp portion of increasing outer diameter greater than an outer surface of said inner cone element in order to facilitate seating of said lip in said circumferential groove.

2. A fishing reel cover as set forth in claim 1, wherein said inner cone element defines an annular band of increased outer diameter located between said rearward end of said inner cone element and said circumferential groove.

3. A fishing reel cover as set forth in claim 2, wherein said first interlocking connection feature comprises threads defined on an inner surface of said annular band.

4. A fishing reel cover as set forth in claim 1, further comprising an eyelet extending through said first line guide hole and said second line guide hole.

5. A fishing reel cover as set forth in claim 4, wherein said eyelet is crimped in position so as to facilitate securement of said outer sheath element to said inner cone element.

6. A fishing reel cover as set forth in claim 1, wherein said outer sheath element includes at least one notch engaging said inner cone element to prevent relative rotation therebetween.

7. A fishing reel cover as set forth in claim 1, wherein said inner cone element defines a reduced inner diameter portion against which fishing line is pinched for casting.

8. A fishing reel cover as set forth in claim 1, wherein said inner cone element is formed of plastic and said outer sheath element is formed of metal.

9. A fishing reel cover as set forth in claim 1, wherein said circumferential groove and said lip each extend continuously about an outer surface of said inner cone element and said rearward end of said outer sheath element, respectively.

10. A fishing reel cover as set forth in claim 9, wherein said lip is inturned.

* * * * *